Jan. 23, 1923.

H. C. INNES.
TOY.
FILED AUG. 11, 1921.

1,442,887

Inventor
Harry C. Innes
By his Attorney

Patented Jan. 23, 1923.

1,442,887

UNITED STATES PATENT OFFICE.

HARRY C. INNES, OF HARTWELL, OHIO.

TOY.

Application filed August 11, 1921. Serial No. 491,555.

*To all whom it may concern:*

Be it known that I, HARRY C. INNES, a citizen of the United States, and a resident of Hartwell, in the county of Hamilton, State of Ohio (whose post-office address is 8360 Burns Avenue, Hartwell, Cincinnati, Ohio), have invented new and useful Improvements in Toys, of which the following is a specification.

My invention relates to a toy, more especially to a toy in the form of a watch, having a dial divided into a number of sectors, divisions or spaces in which spaces instructions are contained or symbols are placed representing values. In the spaces may be placed illustrations representing the values of the thirteen cars forming a suit in a deck of cards, or words such as the affirmative word "Yes" or the negative word "No", which may be used to answer questions capable of being answered by an affirmative or a negative, and in one or more spaces may be placed the word "Doubtful" or zero marks or other suitable words or symbols tending to show that no answer is made or that the answer is doubtful or representing other instructions or values. In conjunction with the dial I have provided means for pointing to one or more of the spaces on the dial whereby the one who is playing with the toy will have questions propounded answered by the inscription in the space pointed to or will be instructed in the value to be credited to the player or otherwise. I have also provided suitable mechanism for moving the pointer or dial or both whereby the pointer will indicate different sectors or spaces on the dial.

Figure 1:
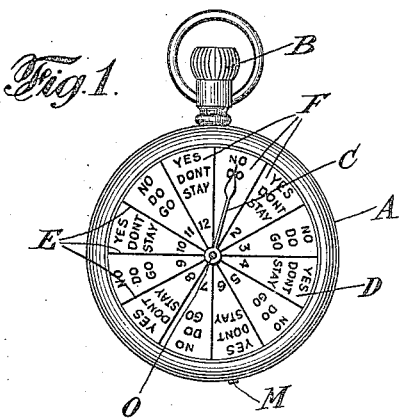

In the drawing in Figure 1, I have shown the face of my toy which is in the form of a watch, having the dial divided into twelve subdivisions, sectors or spaces in all of which I have placed words or numerals or both, and have shown the pointer in the form of a hand adapted to be rotated until it comes to a stop by reason of the spring having run down, or the momentum having lost its force, or adapted to be stopped by the small slide stop on the side.

Figure 2:
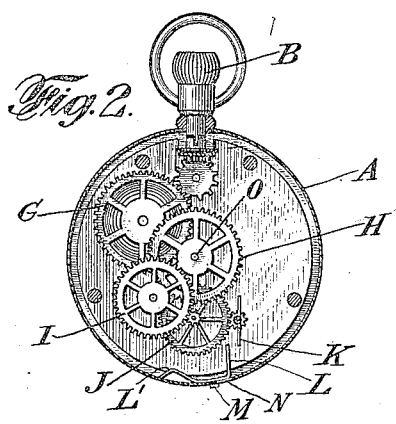
Figure 3:
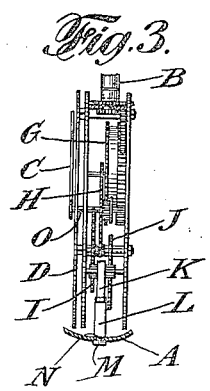

In the accompanying drawing, Figure 1 represents the face of the toy, Figure 2 represents the toy with the face removed showing the operating mechanism, and Figure 3 represents a cross section of the toy with the case removed.

In the drawings in which like characters relate to like parts; A is the case, B is the stem, such as a watch stem, adapted to be rotated to wind the spring for operating the hand or pointer C which rotates over the dial D. The dial D is divided into twelve sectors, divisions or spaces by the division lines E. These sectors or spaces F have on them as shown the numerals 1 to 12, every other sector or space having on it the word "Yes" and the words "Don't" and "Stay", while the intervening sectors have on them the words "No", "Do" and "Go"; in other words the sectors containing the odd numerals from 1 to 11 inclusive have on the words "No", "Do" and "Go" while the sectors bearing the even numerals 2 to 12 inclusive have in addition to the numerals the words "Yes", "Don't" and "Stay". Any form of subdivision for the spaces F could be used as found desirable.

I have provided operating means for my toy to rotate index pointer or hand C, whereby the index pointer will designate different sectors or spaces on the dial, consisting of a spring mounted upon the shaft of the wheel G so as to rotate the wheel G which in turn rotates the wheels H, I, J and governor K. The stem B and the gears and spring G to J inclusive are similar to the operating mechanism of a watch. The governor K is preferably made in the form of two outwardly extending blades mounted on a post to which is fixedly secured a gear that meshes with the gear J, whereby the governor K is rotated with the gears G to J inclusive, and the speed of rotation of the gears is in turn governed by the governor K and the tension of the spring G.

I also provide means for stopping the mechanism which consists of a small pin M projecting outwardly thru the case A as shown in Figure 1, having on its inner end the arm L which when the pin M is moved toward the governor will carry with it the arm L so as to project against one of the blades of the governor, whereby the rotation of the gears is stopped. This arm L at the opposite end is bent to form a spring L' so as to hold the pin M in any position it is placed in the slide N. The head of the pin M being larger than the slide N it is easily held by the spring L' against the surface of the casing A in any desired position in the slide way by friction.

Mounted upon the shaft O of the central wheel H, is the index pointer C which rotates with the shaft. The dial D is fixedly mounted to the frame containing the gearing and the pointer C rotates around the dial clockwise and may be stopped by the pin M, or allowed to rotate until the spring having exhausted its power the gearing comes to a stop, and the pointer C designates the sector or the space on the dial. Of course the pointer C could be fixedly secured in place and the dial attached to shaft O so as to rotate therewith if desired. In using the pin M to stop the mechanism the toy could be turned over so that the person playing with it could not see the dial and would not know when stopping it at what point the index pointer would be until it was turned over to look at the dial.

Many amusing questions could be answered or games played with the toy, as for instance the asking of questions as to whether or not to do a certain thing which would be answered by "yes" or "no" or "don't" or "do"; or whether a certain thing would happen which would be answered by "yes" or "no"; or whether or not the one playing with the toy should go on a trip or not which would be answered by the word "stay" or "go." If desired the sector or spaces could be of different colors or of alternating colors.

Claims:

1. In a toy, a dial divided into spaces, an index adapted to indicate different spaces, means for causing said toy to be operated whereby the index is caused to indicate different spaces and a governor adapted to control the speed of operation of said means.

2. In a toy, a dial divided into spaces, an index adapted to indicate the different spaces, means for causing said toy to be operated whereby the index is caused to indicate different spaces and a governor adapted to control the speed of operation of said means, and means adapted to engage with said governor for stopping the operation of the toy.

3. In a toy, a casing, a dial subdivided into sector spaces, markings in said spaces representing instructions, an index, spring operating mechanism whereby said index is caused to indicate different sector spaces, and a fan governor for said operating means.

In testimony whereof, I have signed my name to this specification.

HARRY C. INNES